(12) United States Patent
Li et al.

(10) Patent No.: US 11,577,975 B2
(45) Date of Patent: Feb. 14, 2023

(54) METHOD FOR CONTROLLING BIO-SLIMES IN A CLEAN CIRCULATING WATER SYSTEM THROUGH A PHYSICAL-CHEMICAL-SUPERCONDUCTING HIGH GRADIENT MAGNETIC SEPARATION COUPLING PROCESS

(71) Applicants: University of Science and Technology Beijing, Beijing (CN); Beijing Mild Technology Co., Ltd., Beijing (CN)

(72) Inventors: Suqin Li, Beijing (CN); Shuaishuai Han, Beijing (CN); Xin Zhao, Beijing (CN); Guohong Xiong, Beijing (CN)

(73) Assignees: University of Science and Technology Beijing, Beijing (CN); Beijing Mild Technology Co., Ltd., Beijing (CN)

( * ) Notice: Subject to any disclaimer, the term of this patent is extended or adjusted under 35 U.S.C. 154(b) by 42 days.

(21) Appl. No.: 16/920,643

(22) Filed: Jul. 3, 2020

(65) Prior Publication Data
US 2021/0017051 A1    Jan. 21, 2021

(30) Foreign Application Priority Data
Jul. 16, 2019  (CN) .......................... 201910642703.7

(51) Int. Cl.
*C02F 1/48* (2006.01)
*C02F 1/52* (2006.01)

(52) U.S. Cl.
CPC ............ *C02F 1/484* (2013.01); *C02F 1/5236* (2013.01); *C02F 2209/05* (2013.01); *C02F 2209/40* (2013.01); *C02F 2303/04* (2013.01)

(58) Field of Classification Search
CPC ...... C02F 1/484; C02F 1/5236; C02F 1/5281; C02F 2103/023; C02F 2209/05;
(Continued)

(56) References Cited

FOREIGN PATENT DOCUMENTS

| CN | 100500589 C | * | 6/2009 |
| CN | 102115238 A | * | 7/2011 |

(Continued)

OTHER PUBLICATIONS

Sag, Biosorption of heavy metals by Zoogloea ramigera: use of adsorption isotherms and a comparison of biosorption characteristics, Apr. 19, 1995, p. 1-7 (Year: 1995).*

(Continued)

*Primary Examiner* — Bobby Ramdhanie
*Assistant Examiner* — Donovan Bui-Huynh

(57) ABSTRACT

There is provided a method for controlling bio-slimes in a clean circulating water system through a physical-chemical-superconducting high gradient magnetic separation coupling process. An inorganic composite flocculant is added to circulating water to gather *Zoogloea* in the circulating water with micro-nano particles in hydrosol through demulsification to form alum floc. The resulting water passes through a superconducting high gradient magnetic separation system. A magnetic field strength of the superconducting high gradient magnetic separation system and flow rate of the circulating water are controlled to generate strong magnetic flocculation to allow floc to grow, such that the *Zoogloea* in the circulating water wraps the micro-nano particles to separate the *Zoogloea* from water.

3 Claims, 2 Drawing Sheets

Experimental schemes in Embodiments 1-6

(58) Field of Classification Search
CPC .............. C02F 2209/40; C02F 2303/04; C02F 2303/20; C02F 2305/08; C02F 2101/18; C02F 2101/20; C02F 2101/306; C02F 2101/36; C02F 3/102; C02F 3/34; C02F 3/342

See application file for complete search history.

(56) References Cited

FOREIGN PATENT DOCUMENTS

| | | | |
|---|---|---|---|
| CN | 102115238 A | | 7/2011 |
| CN | 102923898 A | * | 2/2013 |
| CN | 102923898 A | | 2/2013 |
| JP | 2010227922 A | | 10/2010 |
| WO | WO-2021064607 A1 | * | 4/2021 |

OTHER PUBLICATIONS

Gadd, Accumulation and Transformation of Metals by Microorganisms, p. 20, 2001 (Year: 2001).*

Ge, Magnetic matrices used in high gradient magnetic separation (HGMS): A review, Oct. 31, 2017, p. 1-7 (Year: 2017).*

Zablotskii; How a High-Gradient Magnetic Field Could Affect Cell Life; Nov. 18, 2016; p. 1-13 (Year: 2016).*

* cited by examiner

METHOD FOR CONTROLLING BIO-SLIMES IN A CLEAN CIRCULATING WATER SYSTEM THROUGH A PHYSICAL-CHEMICAL-SUPERCONDUCTING HIGH GRADIENT MAGNETIC SEPARATION COUPLING PROCESS

CROSS-REFERENCE TO RELATED APPLICATIONS

This application claims the benefit of priority from Chinese Patent Application No. 201910642703.7, filed on Jul. 16, 2019. The content of the aforementioned application, including any intervening amendments thereto, is incorporated herein by reference in its entirety.

TECHNICAL FIELD

The present application relates to water treatment, and more particularly to a method for controlling bio-slimes in a clean circulating water system through a physical-chemical-superconducting high gradient magnetic separation (HGMS) coupling process.

BACKGROUND

High-temperature equipment is commonly used in most industries, and the circulating cooling of such equipment is often required. For an open recirculating cooling system, during its operation, a growing number of suspended micro-nano particles are generated in the cooling tower because of suction under negative pressure and increased cycles of concentration, which provides favorable conditions for the growth of microorganisms such as bacteria and algae, contributing to formation of bio-slimes.

The formed bio-slimes greatly affects the normal, continuous and stable operation of the recirculating cooling system, which is a worldwide problem. Especially for the open recirculating cooling system, the bio-slimes will not only aggravate the corrosion, causing equipment damage and production stoppage, but also increase the resistance of water delivery and the pressure of the pump, increasing the operating cost of the motor and reducing energy efficiency. Moreover, the bio-slimes adhere to tube walls, which easily causes the blockage of the heat exchange tube and the cooling tower filler, increasing the heat transfer resistance, lowering the mass-transfer efficiency and increasing energy and water consumption.

Currently, the common clean circulating water treatment method employs the water treatment agents such as cleaning agents, pre-filming agents, dispersing agents, scale and corrosion inhibitors, bactericides and algicides, and slime stripping agents, which have high cost-efficiency and good affinity. Among these water treatment agents, the bactericides and algicides and the slime stripping agents are most commonly used to control the bio-slimes. However, the continuous addition of oxidizing bactericides and algicides and the slime stripping agents will make the bacteria and algae in the circulating water be resistant to these agents. Meanwhile, the water treatment agents remaining in the water adversely affect the long-term and stable operation of the recirculating cooling system, and increase the operation cost.

SUMMARY

In order to solve the problem of bio-slime growth in the existing recirculating cooling system, this application aims to provide a method for controlling bio-slimes in a clean circulating water system through a physical-chemical-superconducting high gradient magnetic separation coupling process, so as to make the clean circulating water system operate stably for a long time, reduce sewage discharge and energy consumption and realize wastewater minimization.

The technical solutions of the application are described as follows.

The present application provides a method for controlling bio-slimes in a clean circulating water system through a physical-chemical-superconducting high gradient magnetic separation (HGMS) coupling process, comprising:

1) adding an inorganic composite flocculant to circulating water to gather *Zoogloea* in the circulating water with micro-nano particles in hydrosol through demulsification to form alum floc; and 2) passing the resulting water obtained in step (1) through a superconducting high gradient magnetic separation system; controlling a magnetic field strength of the superconducting high gradient magnetic separation system and flow rate of the circulating water to generate strong magnetic flocculation to allow floc to grow, such that the *Zoogloea* in the circulating water wraps the micro-nano particles to separate the *Zoogloea* from water.

In some embodiments, the inorganic composite flocculant in step (1) has a micro-nano branched structure with a boric acid and a silicate group, as composite flocculants disclosed in a patent titled "A boron-containing polysilic aluminum ferric sulfate composite flocculant" and a patent titled "A polysilicate ferric zinc borate sulfate composite flocculant".

The amount of the inorganic composite flocculant in step (1) is 10-80 mg/L.

In step (2), the magnetic field strength of the superconducting high gradient magnetic separation system is 1.5-4.0 T, and the flow rate of the circulating water is 0.5-4 mm/s.

The method of the present application combines a highly-effective composite flocculant and the superconducting high gradient magnetic separation technique, which provides a new idea for controlling bio-slimes and removing bacteria and algae in the circulating water. Superconducting treatment is chlorine-free and able to remove the bacteria and algae, which avoids the risk caused by the introduction of chloride in the system, alleviating the corrosion to the cooler and prolonging the service life of the cooler.

Compared to the prior art, the present application has the following beneficial effects:

1) The method of the present application is a green technique to reduce or avoid the addition of the bactericides and algicides and the slime stripping agents and reduce the after-effects caused by agent residue, benefiting the long-term stable operation of the circulating water system.

2) The method of the present application can avoid the growth and adhesion of the bio-slimes on surfaces of the cooling equipment and pipelines at source, so as to avoid the formation of dirt to ensure the heat exchange effect and effectively avoid the corrosion caused by the dirt to ensure the normal production operation. In addition, the method of the present application can stabilize the water quality, increase the cycles of concentration and save water and energy.

3) In the process of treating the circulating water using the superconducting coupling technique, there is no need to add magnetic seeds, and the treatment can be performed without changing the original water treatment process, so that the investment is reduced. In addition, the present application involves less space occupation and simple operational process.

4) In some embodiments of the present application, the use of the oxidizing bactericides and algicides and the slime stripping agents is avoided, such that the bacteria and algae in the circulating water will not easily be resistant to these agents, and no agents remain in the water to adversely affect the circulating water system.

DETAILED DESCRIPTION OF EMBODIMENTS

This application will be further described in detail below with reference to the accompanying drawings and the embodiments for better illustrating the technical problems to be solved, technical solutions and advantages of the present application.

This application provides a method for controlling bio-slimes in a clean circulating water system through a physical-chemical-superconducting HGMS coupling process, which is described as follows.

1) An inorganic composite flocculant is added to circulating water to gather *Zoogloea* in the circulating water with micro-nano particles in hydrosol through demulsification to form alum floc.

2) The resulting water obtained in step (1) passes through a superconducting high gradient magnetic separation system. A magnetic field strength of the superconducting high gradient magnetic separation system and flow rate of the circulating water are controlled to allow the *Zoogloea* in the circulating water to wrap the micro-nano particles to separate the *Zoogloea* from water.

The present application will be illustrated with reference to the embodiments as follows.

Embodiment 1

Figure 1:
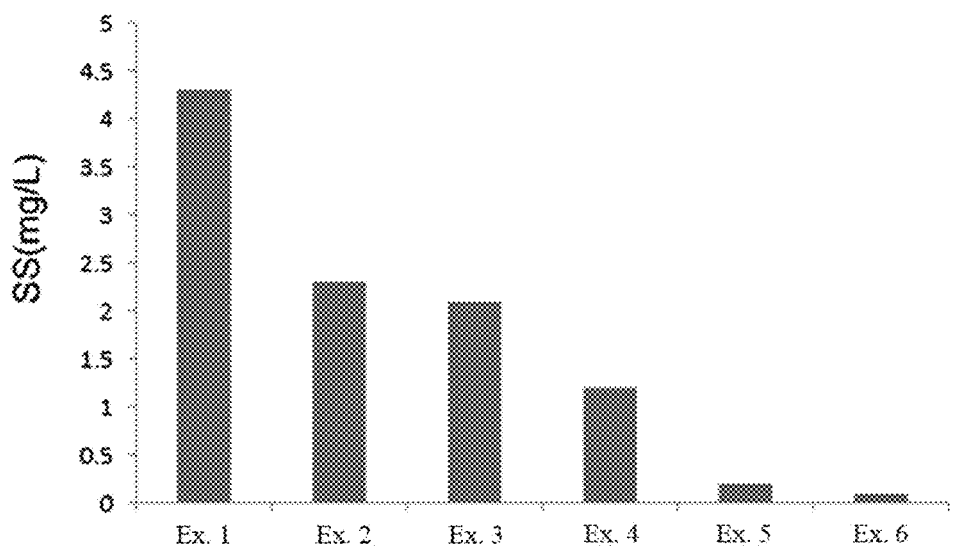
FIG. 1 shows the effect of removing suspended solid from clean circulating water by using a method for controlling bio-slimes in a clean circulating water system through a physical-chemical-superconducting high gradient magnetic separation coupling process according to Embodiments 1-6 of the present application.
Figure 2A:
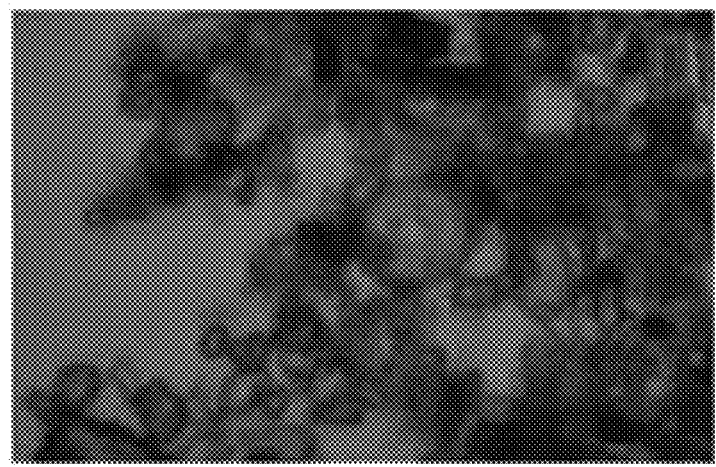
FIG. 2A is a micrograph of slime A in circulating water before superconducting treatment according to Embodiment 7.
Figure 2B:
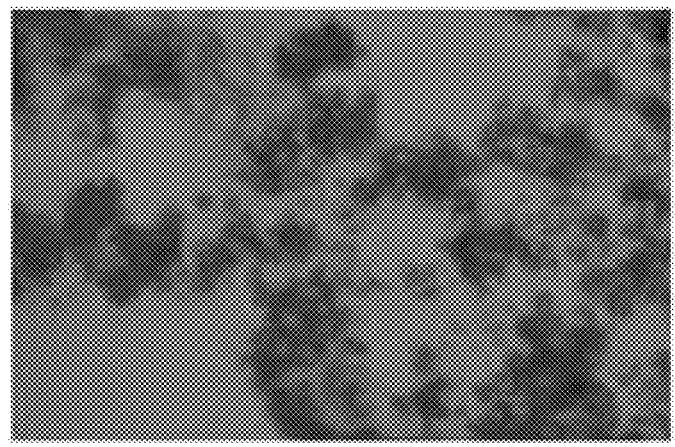
FIG. 2B is a micrograph of slime A in circulating water after superconducting treatment according to Embodiment 7.
Figure 2C:
FIG. 2C is a micrograph of slime B in circulating water before superconducting treatment according to Embodiment 7.
Figure 2D:
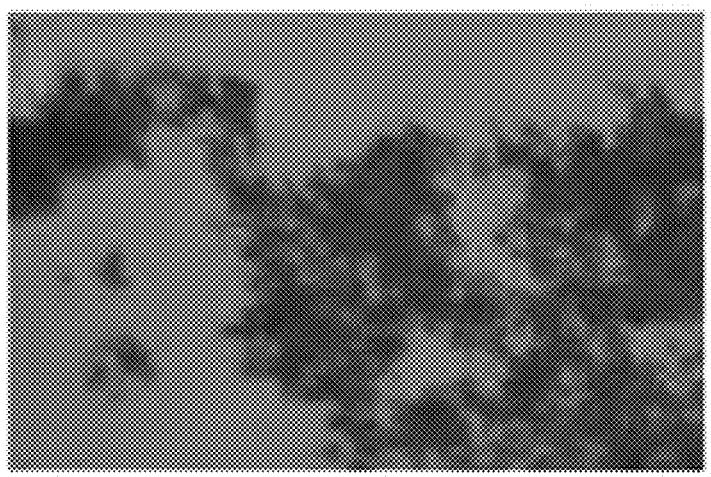
FIG. 2D is a micrograph of slime B in circulating water after superconducting treatment according to Embodiment 7.

The industrialized test was carried out on clean circulating water in an air separation system of an oxygen manufactory which had the strictest water quality requirements. In this embodiment, the concentration of suspended solid (SS) in the clean circulating water was 11.5 mg/L; the magnetic field strength was 2.0 T; the flocculant included 20-50% by weight of sodium silicate, 20-40% by weight of iron sulfate, 20-40% by weight of zinc sulfate and 5-30% by weight of sodium borate; the concentration of the flocculant added in the clean circulating water was 10 mg/L; and the flow rate of the clean circulating water was 0.4-4 mm/s. The flocculation and the superconducting coupling treatments were carried out on the clean circulating water under the given conditions, and the testing results showed that the concentration of SS in the clean circulating water dropped to 4.3 mg/L, as shown in Ex. 1 of FIG. 1.

Embodiment 2

The industrialized test was carried out on clean circulating water in an air separation system of an oxygen manufactory which had the strictest water quality requirements. In this embodiment, the concentration of SS in the clean circulating water was 10.8 mg/L; the magnetic field strength was 3.0 T; the flocculant included 20-50% by weight of sodium silicate, 20-40% by weight of iron sulfate, 20-40% by weight of aluminum sulfate and 5-30% by weight of sodium borate; the concentration of the flocculant added in the clean circulating water was 10 mg/L; and the flow rate of the clean circulating water was 0.4-4 mm/s. The flocculation and the superconducting coupling treatments were carried out on the clean circulating water under the given conditions, and the testing results showed that the concentration of SS in the clean circulating water dropped to 2.4 mg/L, as shown in Ex. 2 of FIG. 1.

Embodiment 3

The industrialized test was carried out on clean circulating water in an air separation system of an oxygen manufactory which had the strictest water quality requirements. In this embodiment, the concentration of SS in the clean circulating water was 11.2 mg/L; the magnetic field strength was 4.0 T; the flocculant included 20-50% by weight of sodium silicate, 20-40% by weight of iron sulfate, 20-40% by weight of aluminum sulfate and 5-30% by weight of sodium borate; the concentration of the flocculant added in the clean circulating water was 10 mg/L; and the flow rate of the clean circulating water was 0.4-4 mm/s. The flocculation and the superconducting coupling treatments were carried out on the clean circulating water under the given conditions, and the testing results showed that the concentration of SS in the clean circulating water dropped to 2.1 mg/L, as shown in Ex. 3 of FIG. 1.

Embodiment 4

The industrialized test was carried out on clean circulating water in an air separation system of an oxygen manufactory which had the strictest water quality requirements. In this embodiment, the concentration of SS in the clean circulating water was 9.9 mg/L; the magnetic field strength was 4.0 T; the flocculant included 20-50% by weight of sodium silicate, 20-40% by weight of iron sulfate, 20-40% by weight of aluminum sulfate and 5-30% by weight of sodium borate; the concentration of the flocculant added in the clean circulating water was 20 mg/L; and the flow rate of the clean circulating water was 0.4-4 mm/s. The flocculation and the superconducting coupling treatments were carried out on the clean circulating water under the given conditions, and the testing results showed that the concentration of SS in the clean circulating water dropped to 1.25 mg/L, as shown in Ex. 4 of FIG. 1.

Embodiment 5

The industrialized test was carried out on clean circulating water in an air separation system of an oxygen manufactory which had the strictest water quality requirements. In this embodiment, the concentration of SS in the clean circulating water was 10.1 mg/L; the magnetic field strength was 4.0 T;

the flocculant included 20-50% by weight of sodium silicate, 20-40% by weight of iron sulfate, 20-40% by weight of aluminum sulfate and 5-30% by weight of sodium borate; the concentration of the flocculant added in the clean circulating water was 30 mg/L; and the flow rate of the clean circulating water was 0.4-4 mm/s. The flocculation and the superconducting coupling treatments were carried out on the clean circulating water under the given conditions, and the testing results showed that the concentration of SS in the clean circulating water dropped to 0.25 mg/L, as shown in Ex. 5 of FIG. 1.

Embodiment 6

The industrialized test was carried out on clean circulating water in an air separation system of an oxygen manufactory which had the strictest water quality requirements. In this embodiment, the concentration of SS in the clean circulating water was 10.6 mg/L; the magnetic field strength was 4.0 T; the flocculant included 20-50% by weight of sodium silicate, 20-40% by weight of iron sulfate, 20-40% by weight of aluminum sulfate and 5-30% by weight of sodium borate; the concentration of the flocculant added in the clean circulating water was 40 mg/L; and the flow rate of the clean circulating water was 0.4-4 mm/s. The flocculation and the superconducting coupling treatments were carried out on the clean circulating water under the given conditions, and the testing results showed that the concentration of SS in the clean circulating water dropped to 0.1 mg/L, as shown in Ex. 6 of FIG. 1.

Embodiment 7

The industrialized test was carried out on clean circulating water in an air separation system of an oxygen manufactory which had the strictest water quality requirements. In this embodiment, the concentration of SS in the clean circulating water was 4.37 mg/L; the magnetic field strength was 4.0 T; the flocculant included 20-50% by weight of sodium silicate, 20-40% by weight of iron sulfate, 20-40% by weight of aluminum sulfate and 5-30% by weight of sodium borate; the concentration of the flocculant added in the clean circulating water was 30 mg/L; and the flow rate of the clean circulating water was 0.4-4 mm/s. The flocculation and the superconducting coupling treatments were carried out on the clean circulating water under the given conditions, and the testing results showed that the concentration of SS in the clean circulating water dropped from 4.37 mg/L to an undetectable level, as shown in Table. 1. A microscope showed the morphologies of various slimes in circulating water before and after the treatment, as shown in FIGS. 2A-D, and it can be concluded that the significant effect of removing bacteria and algae was obtained in the embodiment.

TABLE 1

The effect of removing SS from clean circulating water in an air separation system of an oxygen manufactory

| | pH | SS concentration (mg/L) | Electrical conductivity (μs/cm) | Viscosity (mPa · s) |
| --- | --- | --- | --- | --- |
| Circulating water before treatment | 8.23 | 4.37 | 1292 | 0.6938 |
| Circulating water after treatment | 7.76 | not detected | 1243 | 2.6947 |

The above are the preferred embodiments of the application. It should be pointed out that any improvements and retouches can be made by those skilled in the art, and these improvements and retouches without departing from the principles of the present application should fall within the scope of the application.

What is claimed is:

1. A method for purifying circulating water in a clean circulating water system, consisting of following steps:
    1) adding an inorganic composite flocculant to the circulating water to gather *zoogloea* in the circulating water with particles in hydrosol through demulsification to form flocs; and
    2) Passing the resulting water obtained in step (1) through a physical-chemical-superconducting high gradient magnetic separation (HGMS) coupling system; setting a magnetic flux density of the physical-chemical-superconducting high gradient magnetic separation coupling system as 1.5-4.0 Tesla and controlling a velocity of the circulating water as 0.5-4 mm/s, such that the *zoogloea* in the circulating water wraps the particles; and separating the *zoogloea* and the particles from water to produce a purified circulating water;
    wherein the inorganic composite flocculant comprises 20-50% by weight of sodium silicate, 20-40% by weight of iron sulfate, 20-40% by weight of zinc sulfate and 5-30% by weight of sodium borate.

2. The method of claim 1, wherein the inorganic composite flocculant in step (1) has a boric acid and a silicate group.

3. The method of claim 1, wherein the amount of the inorganic composite flocculant in step (1) is 10-80 mg/L.

* * * * *